US009721483B2

(12) United States Patent
Cowperthwait et al.

(10) Patent No.: US 9,721,483 B2
(45) Date of Patent: Aug. 1, 2017

(54) MEDICAL TREATMENT SIMULATION DEVICES

(71) Applicants: Amy Cowperthwait, Bear, DE (US); Joseph Biggs, Middletown, DE (US); Dominic Campagnola, Newark, DE (US); Devon Bond, Chadds Ford, PA (US); Edward Doll, Baltimore, MD (US); Nathan Hott, Great Falls, VA (US); Francis Rivera, Elkton, MD (US); Jenni Buckley, Newark, DE (US); Liyun Wang, Newark, DE (US)

(72) Inventors: Amy Cowperthwait, Bear, DE (US); Joseph Biggs, Middletown, DE (US); Dominic Campagnola, Newark, DE (US); Devon Bond, Chadds Ford, PA (US); Edward Doll, Baltimore, MD (US); Nathan Hott, Great Falls, VA (US); Francis Rivera, Elkton, MD (US); Jenni Buckley, Newark, DE (US); Liyun Wang, Newark, DE (US)

(73) Assignee: University of Delaware, Newark, DE (US)

(*) Notice: Subject to any disclaimer, the term of this patent is extended or adjusted under 35 U.S.C. 154(b) by 314 days.

(21) Appl. No.: 14/466,027

(22) Filed: Aug. 22, 2014

(65) Prior Publication Data

US 2015/0056592 A1 Feb. 26, 2015

Related U.S. Application Data

(60) Provisional application No. 61/916,307, filed on Dec. 16, 2013, provisional application No. 61/868,601, filed on Aug. 22, 2013.

(51) Int. Cl.
*G09B 23/28* (2006.01)

(52) U.S. Cl.
CPC .................. *G09B 23/288* (2013.01)

(58) Field of Classification Search
CPC ..................................... G09B 23/28
(Continued)

(56) References Cited

U.S. PATENT DOCUMENTS 6,319,011 B1  11/2001  Motti
8,408,920 B2   4/2013  Speller
(Continued)

FOREIGN PATENT DOCUMENTS

CN  201886681  6/2011
CN  202373225  8/2012
(Continued)

OTHER PUBLICATIONS

Castillo, Carrie A, 'Cut suits' help soldiers stay a cut above in realistic training exercise, Joint Base San Antonio, Jun. 4, 2014, pp. 1-2, <http://www.jbsa.af.mil/news/story.asp?id=123413317>.
(Continued)

*Primary Examiner* — Robert J Utama
*Assistant Examiner* — Robert P Bullington
(74) *Attorney, Agent, or Firm* — RatnerPrestia

(57) ABSTRACT

Medical treatment simulation devices are disclosed. One device includes an overlay, a tracheostomy structure, one or more tubes, at least one sensor, and at least one feedback device. The overlay is configured to be secured to a subject. The overlay is configured to cover at least a portion of a neck and upper torso of the subject. The tracheostomy structure is provided in a neck portion of the overlay. The one or more tubes are positioned within the overlay. The tubes are connected to the tracheostomy structure. The sensor is coupled to the tracheostomy structure and configured to detect a manipulation of the tracheostomy structure. The feedback device is coupled to the overlay. The feedback
(Continued)

device is configured to provide feedback based on the manipulation detected by the at least one sensor.

20 Claims, 7 Drawing Sheets

(58) Field of Classification Search
USPC .......................................................... 434/265
See application file for complete search history.

(56) References Cited

U.S. PATENT DOCUMENTS

| | | |
|---|---|---|
| 8,491,309 B2 | 7/2013 | Parry |
| 8,882,511 B2 | 11/2014 | McKenzie |
| 2007/0218438 A1* | 9/2007 | Sanders ................. G09B 23/30 434/236 |
| 2008/0171311 A1 | 7/2008 | Centen |
| 2010/0062407 A1 | 3/2010 | Lecat |
| 2011/0223573 A1 | 9/2011 | Miller |
| 2012/0270197 A1 | 10/2012 | Brost |
| 2013/0059279 A1* | 3/2013 | Reid-Searl ............ G09B 23/30 434/267 |
| 2013/0196302 A1 | 8/2013 | Lecat |
| 2013/0337425 A1 | 12/2013 | Allen |
| 2014/0004494 A1 | 1/2014 | Griesser et al. |
| 2015/0024363 A1 | 1/2015 | Segall |
| 2015/0086958 A1 | 3/2015 | Lewis |

FOREIGN PATENT DOCUMENTS

| | | |
|---|---|---|
| CN | 202523292 U | 11/2012 |
| CN | 202549149 | 11/2012 |
| JP | 2005227534 | 8/2005 |
| WO | 2009097045 | 8/2009 |
| WO | 2009149090 | 12/2009 |
| WO | 2011051172 A1 | 5/2011 |
| WO | 2012003023 | 1/2012 |
| WO | 2013029081 | 3/2013 |
| WO | 2015027286 | 3/2015 |

OTHER PUBLICATIONS

Maternova, "Low-cost Birth Simulator Kit," 2015, 1 page, <http://maternova.net/low-cost-birth-simulator-kit>.
Entire patent prosecution history of U.S. Appl. No. 14/466,027, filed Aug. 22, 2014, entitled, "Medical Treatment Simulation Devices.".
International Preliminary Report on Patentability and Written Opinion for International Application No. PCT/US2015/060889, issued May 23, 2017, 7 pages.
Advanced Patient Care Simulator S230.10. Male and Female Catheterization User Guide, Gaumard Scientific Company, 2012, pp. 1-16.

* cited by examiner

MEDICAL TREATMENT SIMULATION DEVICES

CROSS REFERENCE TO RELATED APPLICATIONS

This application claims priority to U.S. Patent Application Nos. 61/868,601 and 61/916,307, the contents of each of which are incorporated herein by reference in their entirety.

FIELD OF THE INVENTION

The present invention relates generally to medical simulations, and more particularly, to simulation devices for training care providers to provide medical treatment.

BACKGROUND OF THE INVENTION

The human anatomy for the respiratory system requires inspired air to enter the body through the mouth or nose the pass to the trachea, bronchi, broncholi, and lung tissue where the oxygen is exchanged for carbon dioxide at the capillary level. There are some diseases or afflictions that require the air to bypass the mouth and nose and enter through the trachea (tracheostomy). A tracheostomy is a surgical procedure to create an opening through the neck into the trachea windpipe. A tube, referred to as a tracheostomy tube, is placed through this opening to provide an airway and to remove secretions from the lungs.

Tracheostomy patients are challenging for healthcare providers to speak with, care for and assess for complications. A tracheostomy is not something commonly seen outside of the hospital or healthcare environment and it requires a different skill set and presents different complications for the healthcare learners. Conventionally, the training process for nursing students related to tracheostomy tube care may employ mannequins that do not provide realistic patient feedback. This lack of feedback makes it difficult for nursing students to gain the education needed to perform proper tracheostomy care when working with actual patients. Accordingly, improved systems and devices are desired for training medical care providers to provide treatment.

SUMMARY OF THE INVENTION

Aspects of the present invention are medical treatment simulation devices.

In accordance with one aspect of the present invention, a medical treatment simulation device is disclosed. The device includes an overlay, a tracheostomy structure, one or more tubes, at least one sensor, and at least one feedback device. The overlay is configured to be secured to a subject. The overlay is configured to cover at least a portion of a neck and upper torso of the subject. The tracheostomy structure is provided in a neck portion of the overlay. The one or more tubes are positioned within the overlay. The tubes are connected to the tracheostomy structure. The sensor is coupled to the tracheostomy structure and configured to detect a manipulation of the tracheostomy structure. The feedback device is coupled to the overlay. The feedback device is configured to provide feedback based on the manipulation detected by the at least one sensor.

BRIEF DESCRIPTION OF THE DRAWINGS

The invention is best understood from the following detailed description when read in connection with the accompanying drawings, with like elements having the same reference numerals. When a plurality of similar elements are present, a single reference numeral may be assigned to the plurality of similar elements with a small letter designation referring to specific elements. When referring to the elements collectively or to a non-specific one or more of the elements, the small letter designation may be dropped. This emphasizes that according to common practice, the various features of the drawings are not drawn to scale unless otherwise indicated. On the contrary, the dimensions of the various features may be expanded or reduced for clarity. Included in the drawings are the following figures.

DETAILED DESCRIPTION OF THE INVENTION

Aspects of the invention are described herein with reference to simulating the treatment of tracheostomy patients. However, it will be understood by one of ordinary skill in the art that the exemplary devices described herein may be used to simulate treatment of a variety of medical conditions, and is not limited to tracheostomy treatment. Other medical treatments suitable for simulation with the disclosed devices will be known to one of ordinary skill in the art from the description herein.

The exemplary devices disclosed herein may be particularly suitable for providing an enhanced level of feedback to the medical care provider relative to conventional training devices. Audio and/or haptic feedback may be provided to the care provider during treatment in order to reinforce proper techniques. Likewise, this feedback may be provided to correct treatment errors that the care provider may otherwise struggled to detect during the simulated treatment. The provision of feedback using the exemplary devices of the present invention may desirably improve the ability of medical care providers to comfortably and effectively treat patients.

Figure 1:
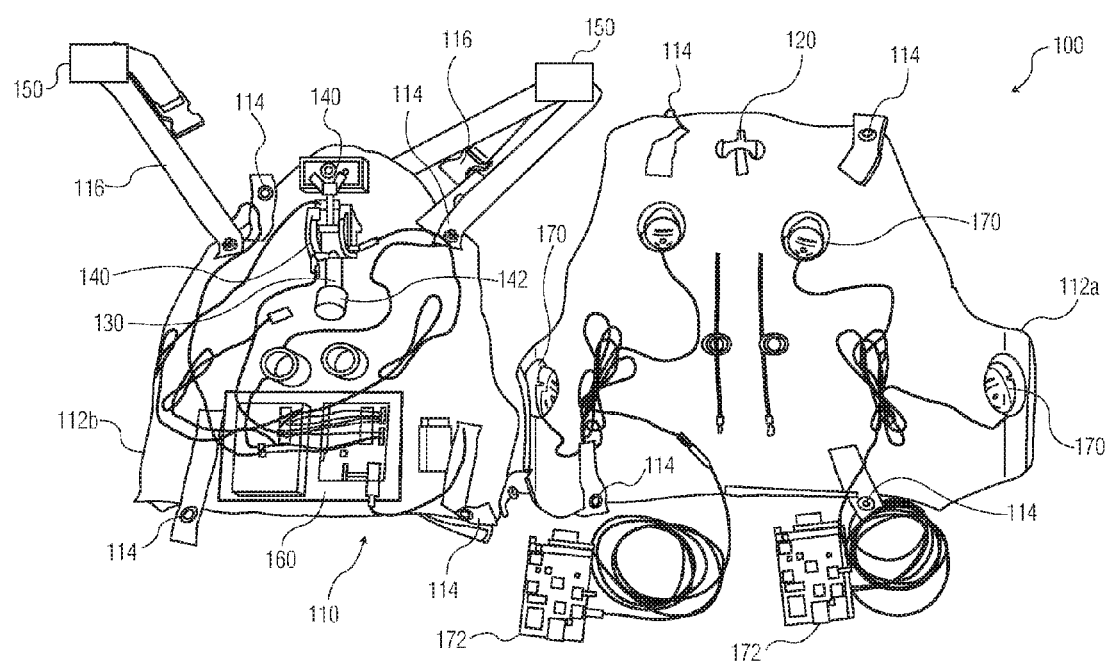
FIG. 1 is an image illustrating an exemplary medical treatment simulation device in accordance with aspects of the present invention.

With reference to the drawings, FIG. 1 illustrates an exemplary medical treatment simulation device 100 in accordance with aspects of the present invention. Device 100 is usable to train medical care providers to provide treat tracheostomy patients. In general, device 100 includes an overlay 110, a tracheostomy structure 120, one or more tubes 130, at least one sensor 140, and at least one feedback device 150. Additional details of device 100 are described below.

Figure 2:
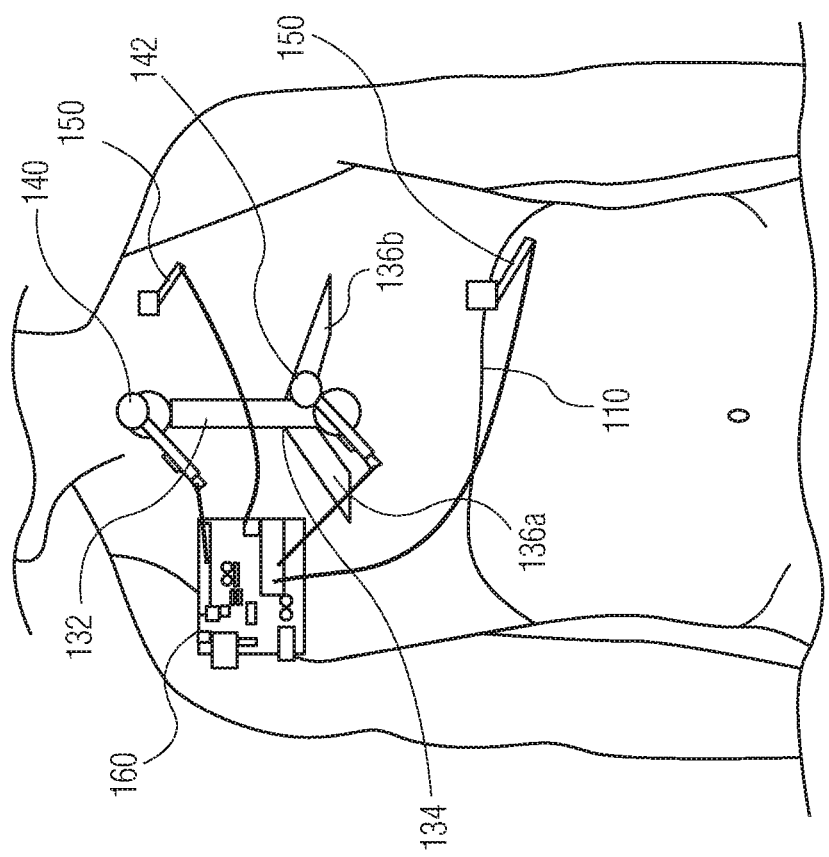
FIG. 2 is a diagram illustrating an exemplary sensor layout of the medical treatment simulation device of FIG. 1 relative to a human subject.
Figure 3:
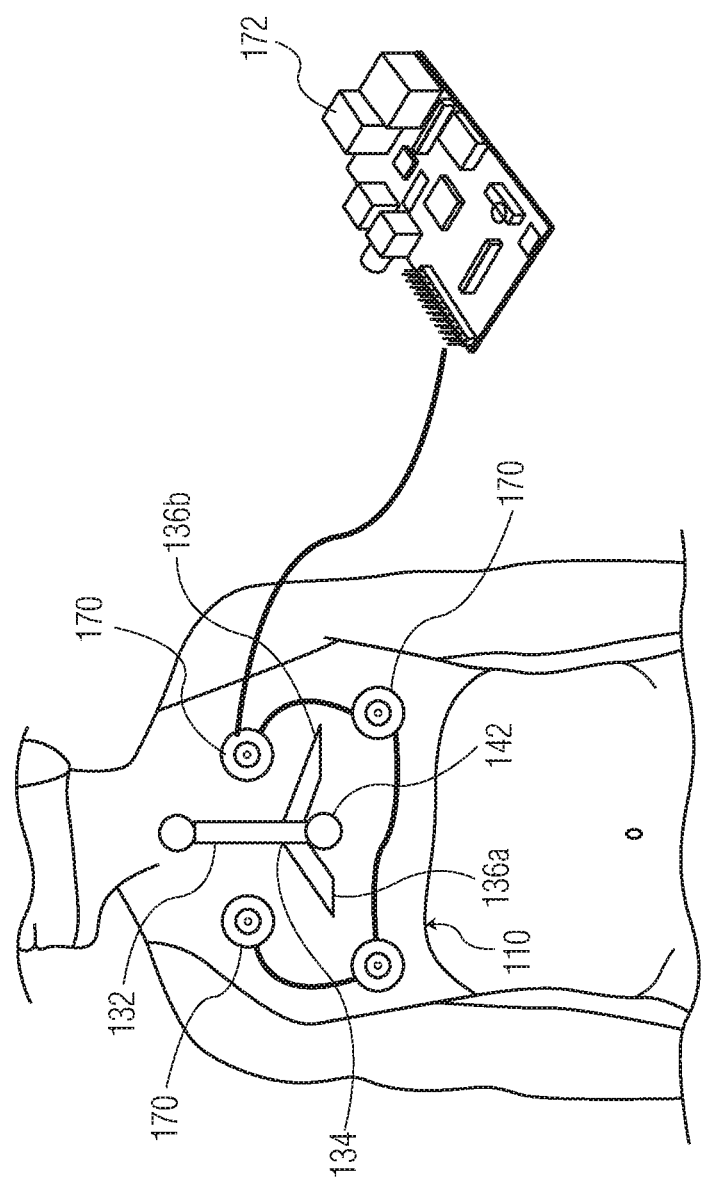
FIG. 3 is a diagram illustrating an exemplary audio feedback layout of the medical treatment simulation device of FIG. 1 relative to a human subject.

Overlay 110 is configured to be secured to a subject who is playing the role of the patient. When secured to the subject, overlay 110 is configured to cover the subject's neck and upper torso. In an exemplary embodiment, overlay 110 is shaped like a patient's neck and upper torso, as shown in FIGS. 1-3. Shaping overlay 110 as described above desirably limits the size of overlay 110, and allows the profile of overlay 110 to closely conform to the body of the subject, thereby allowing the subject to portray a tracheostomy patient.

Overlay 110 may be formed from multiple pieces that connect to define an enclosure for the components of device 100. In an exemplary embodiment, overlay 110 is a housing formed from a front shell 112a and a rear shell 112b, as shown in FIG. 1. FIG. 1 shows the inside surfaces of both front shell 112a and rear shell 112b. Front shell 112a is configured to be removably connected to rear shell 112b to form overlay 110. Shells 112a and 112b may be attached, for example, by straps, buttons, snaps, or any other structures known in the art. In an exemplary embodiment, shells 112a and 112b are attached via snaps 114 provided at the upper and lower ends of the shells 112a and 112b.

In an exemplary embodiment, overlay 110 may be formed from three separate components designed to best simulate the body of a tracheostomy patient. The pieces include the attachable hard shells 112a and 112b, a soft and pliable front surface material intended to simulate the patient's skin ("artificial skin"), and a soft back surface material for providing comfort to the subject wearing overlay 110. The operational components of device 100 (e.g. sensors and feedback devices) are provided within the hard shells of overlay 110, which thereby provides protection for these components and helps conceal wiring and other items.

Figure 6A:
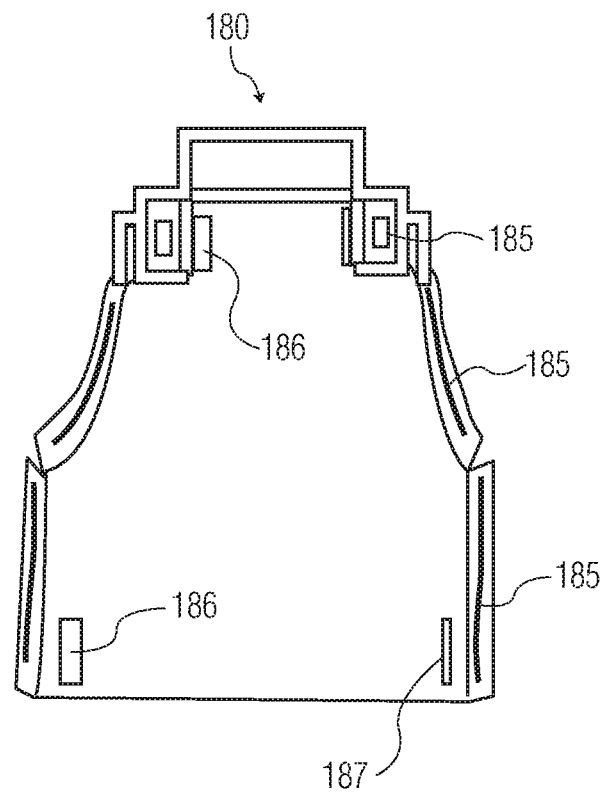
FIGS. 6A and 6B are diagrams illustrating an exemplary surface layer of the medical of the medical treatment simulation device of FIG. 1.
Figure 6B:
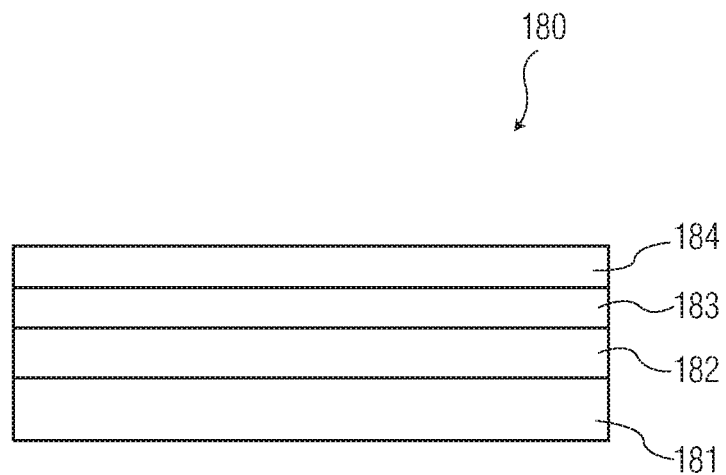

An exemplary embodiment of the artificial skin layer 180 is shown in FIGS. 6A and 6B. The artificial skin layer 180 may include sound dampening material 181 in order to dampen sounds generated within overlay 110, as will be discussed below in greater detail. The artificial skin may further provide layers of materials on the outside of one or both of hard shells 112a and 112b for simulating the patient's body. In an exemplary embodiment, the layers of material include memory foam 182, PVC 183, and a nylon elastane layer 184. It will be understood that the selection, order, and thickness of layers of artificial skin layer 180 shown in FIG. 6B is provided for the purpose of illustration, and is not intended to be limiting. Other suitable materials for use in simulating a patient's skin will be generally known to one of ordinary skill in the art from the description herein.

The layers of artificial skin 180 may be attached to the edges of the hard shells of overlay 110 via one or more attachment mechanisms. Suitable attachment mechanisms include, for example, hook-and-loop fasteners 185, anchors 186, or double-sided tape 187, as shown in FIG. 6A. Other suitable attachment mechanisms will be known to one of ordinary skill in the art from the description herein.

Rear shell 112b further includes a plurality of straps 116 for securing overlay 110 to a subject. In an exemplary embodiment, rear shell 112b includes a pair of straps configured to encircle the subject's shoulders, as shown in FIG. 1. Straps 116 are usable to secure device 100 to the subject during the simulated treatment. Rear shell 112b may further include a foam layer on the rear thereof, in order to improve the comfort of the subject wearing overlay 110.

Tracheostomy structure 120 is provided on overlay 110. Structure 120 is designed to simulate the structures implanted in an actual tracheostomy patient. Accordingly, structure 120 is provided on the neck portion of overlay 110.

In an exemplary embodiment, structure 120 includes a tracheostomy faceplate 122, and a tracheostomy tube 124 attached thereto. A suitable tracheostomy structure 120 for use with the present invention is provided in FIG. 4 for the purpose of illustration.

While in this embodiment structure 120 relates to tracheostomy treatment, it will be understood that the invention is not so limited. Other suitable structures for simulating medical treatments will be known to one of ordinary skill in the art from the description herein.

Tubes 130 are positioned within overlay 110, and connected to tracheostomy structure 120. Tubes 130 are designed to simulate the airways of an actual tracheostomy patient. Accordingly, tubes 130 have a shape and size corresponding to the bronchial tubes of a patient. In an exemplary embodiment, tubes 130 include a first length of tubing 132 leading to a bifurcation 134, and a pair of tubes 136a and 136b extending from the bifurcation. An exemplary layout of tubes 130 within overlay 110 is shown by diagram in FIGS. 2 and 3. During the simulated medical treatment, the care provider may be asked to insert a suction tube through tracheostomy structure 120 and into tubes 130, in order to simulate drainage of a patient's lungs 130.

Sensor 140 is coupled to tracheostomy structure 120. Sensor 140 detects any manipulation of tracheostomy structure 120 during the simulated treatment of the subject. Examples of manipulations of tracheostomy structure 120 are set forth below.

Figure 4:
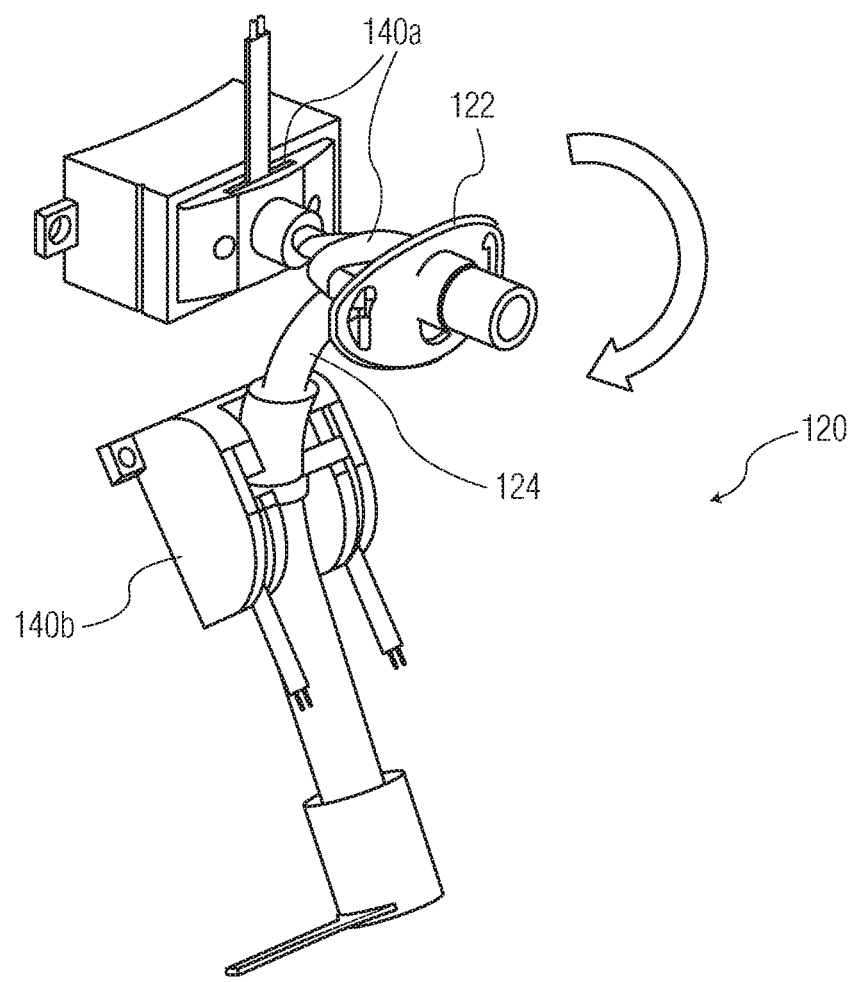
FIG. 4 is an image illustrating an exemplary tracheostomy structure and sensor layout of the medical treatment simulation device of FIG. 1.

In one exemplary embodiment, the sensor includes a normal force sensor 140a. In this embodiment, sensor 140a is configured to detect a force on tracheostomy structure 120 during the simulated treatment. The force may be a force normal to the tracheostomy structure (e.g., normal to tracheostomy faceplate 122 in FIG. 4). Sensor 140a may be an electrical force sensor positioned behind tracheostomy faceplate 122 and configured to detect a normal force on tracheostomy faceplate 122, as shown in FIG. 4. In actual tracheostomy patients, excessive force on a tracheostomy faceplate (e.g., a normal force in excess of 2 lbs.) can be a source of discomfort. Accordingly, the detection of force on tracheostomy structure 120 may be desirable in order train care providers to limit excessive force on structure 120 and prevent discomfort in actual patients.

In the above embodiment, the force sensors used are force-sensitive resistors (FSRs). FSRs are dynamic resistors that have nearly infinite resistance when no force is applied. The resistivity of the FSR decreases, non-linearly, as the force applied increases. In this embodiment, the voltage measured across the sensor may be converted into a detection of an applied force on tracheostomy structure 120.

In another exemplary embodiment, the sensor includes a rotation sensor 140b. In this embodiment, one or more force sensors 140b are configured to detect a rotation of tracheostomy structure 120 during the simulated treatment. The rotation of tracheostomy structure 120 may be an axial rotation of tracheostomy faceplate 122, as shown by a block arrow in FIG. 4. Sensor 140b may include a pair of force sensors positioned on opposed rotatable projections behind tracheostomy faceplate 122, as shown in FIG. 4, such that rotation of the faceplate 122 in either direction provides a force on the adjacent force sensor. The amount of rotation of the tracheostomy faceplate 122 may be measured by determining the corresponding force detected by sensor 140b (which increases in a determinable manner as rotational displacement increases). In actual tracheostomy patients, as with force, excessive rotation of a tracheostomy faceplate (e.g., an axial rotation in excess of 4 degrees) can also be a source of discomfort. Accordingly, the detection of rotation of tracheostomy structure 120 may be desirable in order train care providers to limit excessive rotation on structure 120 and prevent discomfort in actual patients.

Figure 5:
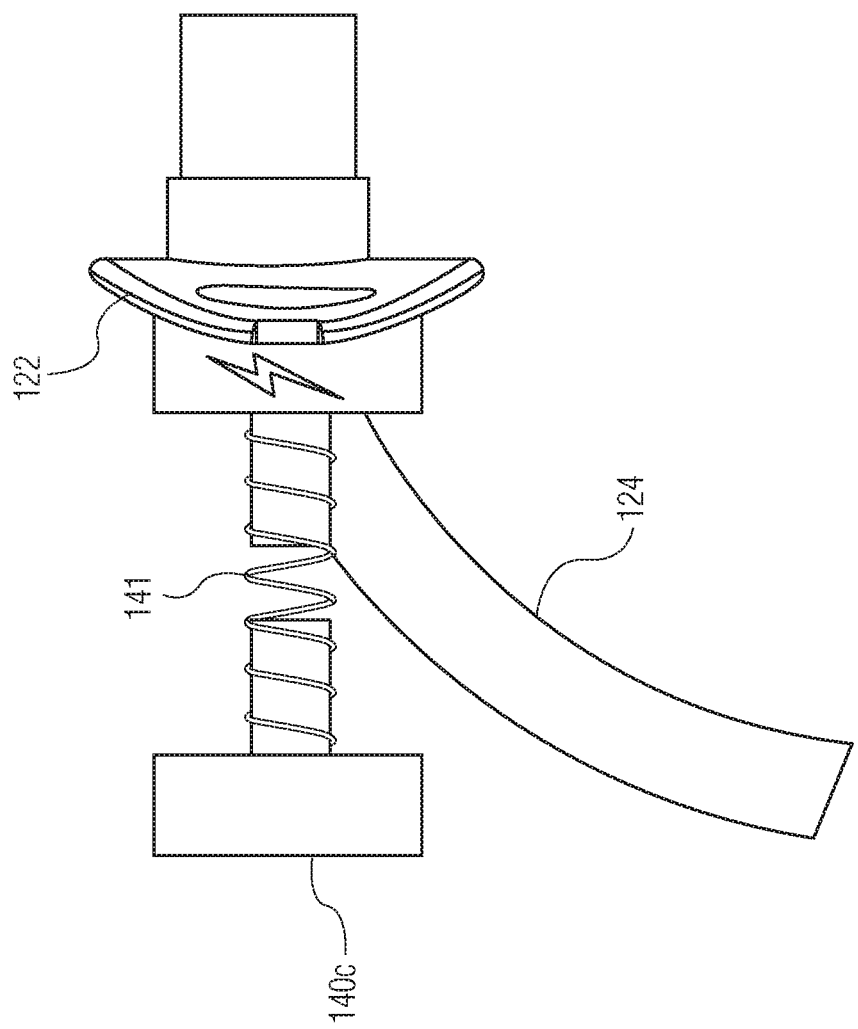
FIG. 5 is an image illustrating an alternative exemplary tracheostomy structure and sensor layout of the medical treatment simulation device of FIG. 1.

In another exemplary embodiment, the sensor includes a spring-based sensor 140c. In this embodiment, the spring-based sensor 140c is configured to detect a force on tracheostomy structure 120 during the simulated treatment. The force may be a force normal to the tracheostomy structure (e.g., normal to tracheostomy faceplate 122 in FIG. 5). Sensor 140c may be a mechanical force sensor that is configured to detect a normal force on tracheostomy faceplate 122 as that force is transmitted through a spring 141 coupled to tracheostomy faceplate 122, as shown in FIG. 5. For example, the sensor may include an electric circuit that is kept open by a spring having a spring constant that corresponds to the response of a human throat. When the force threshold is exceeded, the circuit closes, thereby signaling excessive force received by the tracheostomy structure 120. Coupling of tracheostomy structure 120 to a spring-based sensor as shown in FIG. 5 may be desirable in order to provide realistic movement of tracheostomy structure 120 during the simulated treatment by the care provider.

The spring-based sensor 140c may further include a circuit that is adapted to be closed during excessive force on tracheostomy structure 120. In an exemplary embodiment, the spring-based sensor 140c includes circuit contacts that are spaced a predetermined distance apart by spring 141. When an excessive force is applied to tracheostomy faceplate 122 (for example), spring 141 is compressed, and the circuit contacts are closed. Closing of the circuit contacts may function to automatically operate one or more feedback device 150, so that feedback is provided as soon as the excessive force is detected.

In addition to providing one or more sensors 140 coupled to tracheostomy structure 120, device 100 may further include one or more sensors 142 coupled to tubes 130. In an exemplary embodiment, sensor 142 is a force sensor coupled to tubes 130 to detect any contact between an inserted suction tube and the inner wall of tubes 130 during the simulated treatment. In a particularly preferred embodiment, sensor 142 is a force sensor coupled to the bifurcation 134 of tubes 130 to detect contact with the bifurcation 134, where contact with the bifurcation 134 is determined to be any force above a predetermined amount (e.g., in excess of 0.5 lbs.). In actual tracheostomy patients, such contact with the patient's bronchial tubes can cause irritation. Accordingly, the detection of contact on bifurcation 134 may be desirable in order train care providers to limit such contact and provide effective treatment to tracheostomy patients.

The above examples of types and locations of sensors 140 are provided for the purposes of illustration, and are not intended to be limiting. It will be understood that any combination of the disclosed sensors may be used, and that additional types and locations of sensors may be used, without departing from the scope of the invention. Other possible sensors for use in device 100 would be known to one of ordinary skill in the art.

Feedback device 150 is also coupled to overlay 110. Feedback device 150 is configured to provide feedback to the user of device 100 (i.e. the care provider) based on the manipulation detected by sensor 140. Feedback may be provided when the manipulation detected by sensor 140 exceeds a predetermined threshold. For example, feedback may be provided to the user when the force on tracheostomy structure 120 exceeds a predetermined limit, or when tracheostomy structure 120 is rotated more than a predetermined amount. Additionally, feedback may be provided to the user when contact of tubes 130 is detected.

In an exemplary embodiment, feedback device 150 is a vibrating motor. The vibrating motor creates a vibration of overlay 110 that can be felt by the user during the simulated treatment of the subject. Suitable vibrating motors for use as Zfeedback device 150 include, for example, a shaftless vibration motor provided by Precision Microdrives (Model 310-101; Size 10 mm).

In another exemplary embodiment, feedback device 150 is an audible alarm. The alarm generates a sound that can be heard by the user during the simulated treatment of the subject. Suitable loudspeakers for use as the audible alarm will be known to one of ordinary skill in the art from the description herein. Other feedback devices, or combinations thereof, will be known to one of ordinary skill in the art from the description herein.

In addition to or alternatively to providing feedback to the care provider, feedback device 150 may also provide feedback to the subject wearing device 100. In an exemplary embodiment, feedback devices 150 may be coupled to straps 116 of overlay 110, in order to provide feedback (e.g., vibration feedback) only to the subject, as shown in FIG. 1. Such feedback may be used as a signal to cause the subject to respond to the simulated treatment in a predetermined way, without directly indicating to the care provider that improper or undesirable treatment has been provided.

Where multiple sensors 140 are employed by device 100, it may be desirable to provide different types of feedback dependent on the information being detected. For example, device 100 may be configured to provide vibration feedback when excessive force or rotation is provided on tracheostomy structure 120, and may be configured to provide audible feedback when contact occurs in tubes 130.

In an exemplary embodiment, each sensor employed by device 100 may have its own feedback device 150 provided in a particular location or type (e.g., in each strap 116), in order for the user and/or the subject to determine which sensor has been triggered during the simulated treatment. For example, sensor(s) 140 for the tracheostomy structure 120 may include a feedback device 150 in the left strap 116, and sensor 142 for the tubes 130 may include a feedback device 150 in the right strap 116. Other possible combinations of sensor detection and feedback will be apparent to one of ordinary skill in the art from the description herein.

Device 100 is not limited to the above-described components, but can include alternate or additional components as would be understood to one of ordinary skill in the art in view of the examples below.

For example, device 100 may include a microcontroller 160. In an exemplary embodiment, microcontroller 160 is connected in communication with sensors 140 and feedback device 150. Microcontroller 160 processes the information detected by sensors 140, and determines whether the sensed manipulations (force, rotation, etc.) exceed predetermined thresholds stored by microcontroller 160. If microcontroller 160 determines that any threshold is exceeded, it sends signals to operate feedback device 150 to provide feedback to the user of device 100.

For another example, device 100 may include one or more speakers 170. Speakers 170 are positioned within overlay 110, and are configured to emit sounds during the simulated treatment of the subject. The care provider may be trained to listen for sounds (e.g., noises within a patient's lungs) during the treatment being provided. Accordingly, device 100 may include a plurality of speakers positioned within overlay 110 in locations corresponding to the areas at which the care provider is trained to listen.

An exemplary layout of speakers 170 is provided in FIG. 3. Suitable loudspeakers for use as speaker 170 include, for example, a miniature speaker provided by Visaton (Model: K 28 WP; Size: 8 ohm 2.3 cm). In this embodiment, simulated lung sounds can be auscultated in four anatomically correct regions of the overlay 110 corresponding to anterior thorax locations, in order to simulate medical conditions such as pneumonia, mucus build up in the upper airway necessitating tracheal suctioning, wheezing (constriction of the air passages in the lungs) necessitating simulated aerosolized medication administration, and finally normal lung sounds indicating treatment choice was effective. Additionally, the layout of speakers 170 could include a rear surface corresponding to the posterior thorax, in order to allow posterior lung auscultation in 4-8 lung fields and include the same options for lung sounds mentioned above.

Speakers 170 emit simulated patient sounds that the care provider would expect to hear from a patient during treatment corresponding to different medical conditions of the patient, as set forth above. Preferably, these sounds are quiet enough that they are inaudible to the care provider without the use of a stethoscope.

Speakers 170 may be connected with one or more microcontrollers 172 for controlling the sounds emitted therefrom, as shown in FIGS. 1 and 3. Microcontrollers 172 may be located with overlay 110, or may be provided remote from overlay 110. Likewise, the connection between speakers 170 and microcontrollers 172 may be wireless or wired. In an exemplary embodiment, a trainer of the care provider may control the sounds emitted from speakers 170 during the simulated medical treatment. This control may include the ability to control when speakers 170 emit sound, which speakers 170 emit sounds, what sounds are emitted, and how loud those sounds are emitted. Alternatively, microcontroller 160 may control the sounds emitted from speakers 170 in addition to the operation of feedback device 150.

Figure 7:
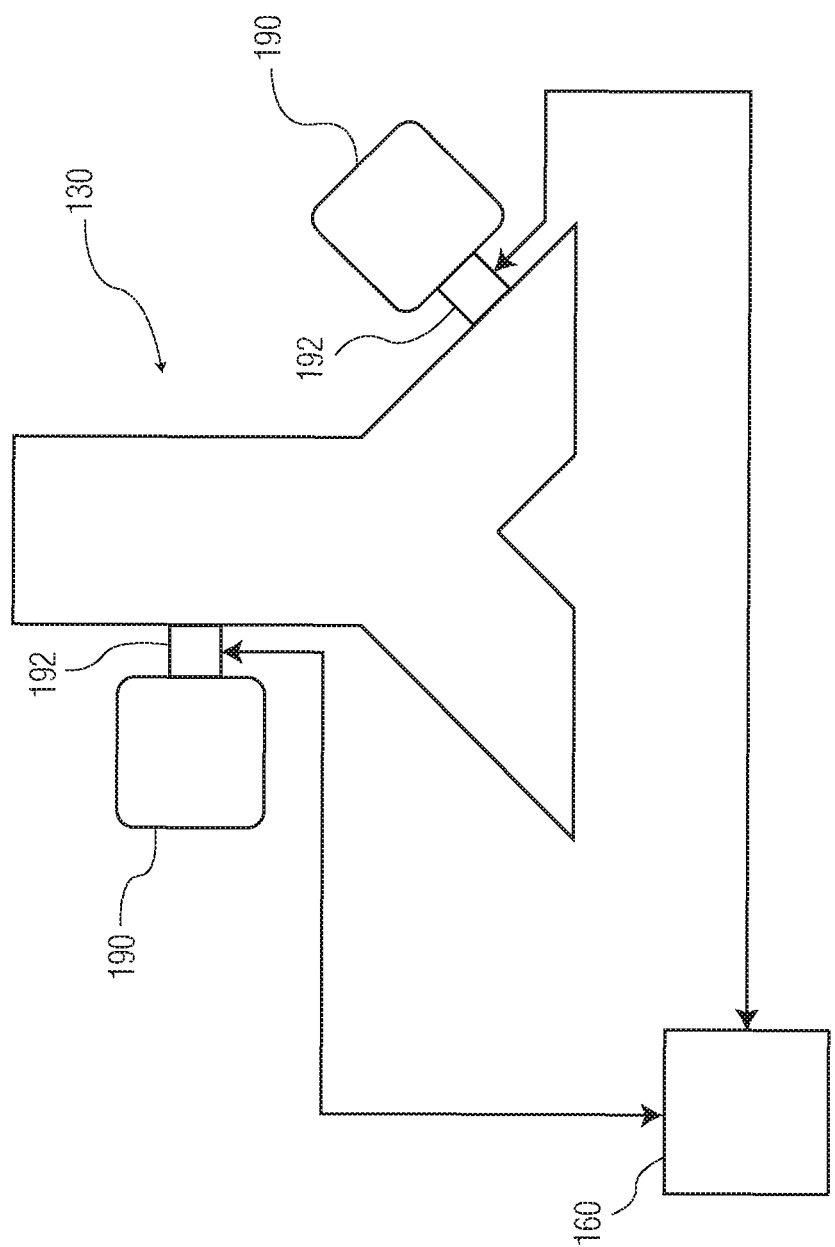
FIG. 7 is a diagram illustrating an exemplary fluid feedback system of the medical treatment simulation device of FIG. 1.

For yet another example, device 100 may include an option to simulate secretions in the airway during treatment. During actual medical treatment of a tracheostomy patient, it is possible for mucus to build up in the patient's bronchial tubes/upper airway. Such buildup may requirement suctioning or tracheostomy care to provide a realistic feel while suctioning. Accordingly, as shown in FIG. 7, device 100 may include one or more reservoirs 190 adapted to store fluid having a viscosity corresponding to the mucus found in a patient. Each of these reservoirs may include one or more valves 192 adapted to release the fluid in the one or more tubes 130. The reservoirs fluid may be released into the tubes 130 by gravity feed, or reservoirs 190 may further include one or more actuators or pumps (such as peristaltic pumps, not shown) for pushing fluid into tubes 130 during the simulated treatment of the patient. Suitable pumps and valves for use in fluid reservoirs will be known to one of ordinary skill in the art from the description herein.

Reservoirs 190 containing simulated mucus may be controlled through substantially the same systems as discussed above with respect to speakers 170. For example, the valves 192 of reservoirs 190 may be electrically coupled to and controlled by microcontroller 160 in a predetermined fashion during the course of a simulated treatment, as shown in FIG. 7. Alternatively, a trainer of the care provider may control the release of fluid from reservoirs during the simulated medical treatment using one or more microcontrollers that are wired or wirelessly connected to the fluid reservoirs.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A medical treatment simulation device comprising:
   an overlay configured to be secured to and cover at least a portion of a neck and upper torso of a subject, the overlay comprising a front shell and a rear shell;
   a tracheostomy structure provided on the front shell of the overlay;
   one or more tubes positioned between the front shell and the rear shell of the overlay, the one or more tubes connected to the tracheostomy structure;
   at least one sensor coupled to the tracheostomy structure and configured to detect a manipulation of the tracheostomy structure; and
   at least one feedback device coupled to the overlay, the at least one feedback device configured to provide feedback based on the manipulation detected by the at least one sensor.

2. The device of claim 1, wherein the overlay has a shape corresponding to a shape of the neck and upper torso of the subject.

3. The device of claim 1, wherein a surface of the overlay comprises a foam material.

4. The device of claim 1, wherein the tracheostomy structure comprises a tracheostomy faceplate.

5. The device of claim 1, wherein the one or more tubes have a shape corresponding to bronchial tubes of the subject.

6. The device of claim 1, wherein the at least one sensor comprises a force sensor coupled to the tracheostomy structure to detect a force on the tracheostomy structure.

7. The device of claim 1, wherein the at least one sensor comprises a sensor coupled to the tracheostomy structure to detect a rotation of the tracheostomy structure.

8. The device of claim 1, wherein the at least one sensor is coupled to the one or more tubes to detect a contact event between an inserted suction tube and an inner wall of the one or more tubes.

9. The device of claim 8, wherein the one or more tubes have a shape corresponding to bronchial tubes of the subject, and the at least one sensor comprises a force sensor coupled to detect a contact event in a bronchial bifurcation of the one or more tubes.

10. The device of claim 1, wherein the at least one feedback device comprises a vibrating motor.

11. The device of claim 1, wherein the at least one feedback device comprises an audible alarm.

12. The device of claim 1, further comprising one or more speakers positioned within the overlay, the one or more speakers configured to emit simulated sounds of a patient.

13. The device of claim 12, wherein the one or more speakers are positioned in the overlay in locations corresponding to areas at which a user is trained to listen.

14. The device of claim 12, wherein the simulated sounds are inaudible to a user without a stethoscope.

15. The device of claim 1, further comprising a microcontroller connected to the at least one sensor and the at least one feedback device, the microcontroller configured to process signals from the at least one sensor and send a signal to operate the at least one feedback device if the signals from the at least one sensor exceed a predetermined threshold.

16. The device of claim 1, wherein the at least one feedback device is configured to provide the feedback to the subject to which the at least one feedback device is secured.

17. The device of claim 16, wherein the overlay comprises one or more straps for securing the overlay to the subject, and wherein the at least one feedback device is disposed along the one or more straps.

18. The device of claim 1, further comprising one or more fluid reservoirs containing a simulated mucus in fluid communication with the one or more tubes.

19. The device of claim 18, further comprising one or more valves operable to enable flow of the simulated mucus from respective ones of the one or more fluid reservoirs into the one or more tubes.

20. The device of claim 3, wherein the surface of the overlay further comprises a nylon elastane material.

* * * * *